United States Patent Office 3,431,297
Patented Mar. 4, 1969

3,431,297
PREPARATION OF ACETIC ACID BY CATALYTIC GAS-PHASE OXIDATION OF BUTENES
Rudolf Brockhaus, Marl, Germany, assignor to Chemische Werke Huls A.G., Marl, Germany
No Drawing. Filed Dec. 23, 1966, Ser. No. 604,147
Claims priority, application Germany, Jan. 7, 1966, C 37,843
U.S. Cl. 260—533
Int. Cl. C07c 51/14, 51/32, 45/02
8 Claims

ABSTRACT OF THE DISCLOSURE

Acetic acid is produced by the gas phase oxidation of butene in the presence of an aluminum vanadate or titanium vanadate catalyst.

---

This invention relates to a process for the production of acetic acid by gas-phase oxidation of butenes with oxygen or gases containing oxygen.

In commonly owned U.S. patent application Ser. No. 531,344, in which the present inventor is a joint inventor, butenes are oxidized in the presence of a tin vanadate catalyst (optionally deposited on an inert support), at temperatures of 200–300° C., preferably 230–260° C., more preferably at 240–250° C., whereby acetic acid is produced.

An object of this invention is to provide an improved process based on the use of different catalysts.

Another object is to provide catalysts and methods of producing same.

Upon further study of the specification and claims, other objects and advantages of the present invention will become apparent.

To attain the above objects, it was discovered that the gas-phase oxidation of butenes with oxygen or oxygen-containing gases can be conducted in the presence of a catalyst of titanium vanadate and/or aluminum vanadate, and that the resultant reaction product constitutes a substantial molar yield of acetic acid.

For producing the vanadate catalyst employed in accordance with the present invention, one method is to combine stoichiometric or substantially stiochiometric amounts of (A) suitable titanium and/or aluminum compounds, for example, the chlorides, nitrates, and sulfates, in an aqueous, and if desired, strongly acidic, solution, with (B) aminovanadate, such as $H_3VO_4(C_2H_5NH_2)_3$ in an aqueous solution—if desired, with neutralization. When proceeding in this manner, there precipitates, unless the reaction is conducted in extreme dilution, a precipitate called titanium vanadate and/or aluminum vanadate. This precipitate is separated from the mother liquor in a conventional manner, washed, dried at 50–200° C., preferably at 170° C., and calcined at 300–700° C., particularly 480–520° C.

Particularly suitable, however, is another method wherein the starting point is a solution of vanadium pentoxide and titanium tetrachloride and/or aluminum trichloride in strong hydrochloric acid. Upon neutralization of the hydrogen ions, a mixed oxide is obtained which precipitates. This mixed oxide will be designated in the following also as "titanium and/or aluminum vanadate." For precipitating this product, a volatile base is advantageously employed, preferably ammonia. The precipitate can be further processed in the above-described manner by drying and calcination to yield the usable catalyst. The calcination step is absolutely necessary. Without calcination in the above mentioned field of temperature the catalyst doesn't possess the high degree of selectivity.

In the catalysts which are ready to be used, the atomic ratio of titanium and/or aluminum to vanadium is 10:1 to 1:10, preferably 1:0.5 to 1:2, and therefore include ortho, pyro and meta-vanadates, especially the ortho and pyro-vanadates.

The catalyst can be mixed with an inert material, such as pure silicic acid in a submicroscopically fine distribution, pumice, etc., the contents of inert material being preferably up to about 60%, more preferably about 70 to 90% by weight of the total catalyst composition. A supported catalyst wherein a catalytically active component is precipitated in the presence of a catalytically active or inert carrier material is also effective.

The catalyts can be employed in all types of reactors suitable for gas-phase oxidation.

The gas-phase oxidation is conducted at temperatures of 200–350° C., preferably at 230–320° C., particularly at 240–315° C. To increase the space-time yield, it is preferred, though not absolutely necessary, to conduct the reaction at superatmospheric pressures of 0.5–15, advantageously 1–6, atmospheres.

Butenes suitable for the gas-phase oxidation are predominantly cis- and trans-n-butene-(2), as well as n-butene-(1). These compounds can be employed in pure form or also in a mixture with one another.

The oxidation medium is molecular oxygen, in the pure form, as well as diluted with other gases, such as, for example, nitrogen, carbon dioxide, and steam. In these dilutions, the oxygen content is to be 2–90% by volume, preferably 10–20% by volume. An air-stream mixture is preferred. A particularly useful oxidizing gas is, for example, a mixture of butene-(2), air, and steam in a volumetric ratio in the range of 1:15:5 to 1:15:15. The composition of the mixture can be varied as long as the explosive ranges are avoided. A decrease in the steam concentration can lessen the selectivity of the catalyst with respect to acetic acid formation.

In the acetic acid synthesis according to the invention, it is desirable to employ an excess of oxygen, the molar ratio of butene to oxygen ranging between 1:1 to 1:20, preferably ranging between 1:2 to 1:5. In the event air is used as the source of oxygen, the molar ratio of butenes to air can range from 1:100 to 1:2, preferably 1:10 to 1:40.

The average residence time of the gas mixture in contact with the catalyst can be varied within certain limits, but it should generally be about 0.5–10 seconds, preferably 1–3 seconds.

The reaction mixture obtained after cooling and condensation can be worked up in a conventional manner—for example by distillation. The waste gas, containing in addition to steam about 80% nitrogen, up to 5% butene, 2–5% carbon oxides and oxygen, can be recycled or processed further.

During the reaction, the hydrocarbon chain is cleared and a terminal carbon is oxidized to form an acid. The best yields of acetic acid are obtained with n-butene, the location of the double bond being unimportant, and iso-butene, as compared with the other butenes, results in less favorable yields of acetic acid. In addition to acetic acid, there are obtained propionic acid and maleic acid, but usually not more than 10% of the total amount of acid.

The reaction by-product to be expected, formic acid, is unstable under the conditions of the gas-phase oxidation and decomposes to carbon monoxide and water. This is of great advantage for processing the reaction products, since formic acid is generally highly corrosive. In addition to these by-products, carbonyl compounds, predominantly formaldehyde, are produced in minute quantities [up to about 1%, based on acetic acid].

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

PRODUCTION OF THE CATALYST

Catalyst I 900 g. titanium tetrachloride and 576 g. vanadium pentoxide are completely dissolved in 4 liters of concentrated hydrochloric acid. Into 2 liters of water in an agitated vessel, the acidic solution is introduced under stirring, and then neutralized with ammoia. A dark-brown precipitate is obtained. During the precipitation, 3 liters of water are gradually added. The precipitation process takes about 30 minutes. The temperature in the agitated vessel is 75° C. At this temperature, the reaction mixture is stirred for another hour; the mother liquor is vacuum-filtered and discarded, the precipitate is thoroughly washed, dried, and then heated for 16 hours at 300° C. and for 8 hours at 500° C.

A portion of the catalyst is comminuted and sieved [mesh size 0.1 to 0.3 mm., apparent density 1.6 kg./l.] and used in a fluidized-bed reactor. Another portion of the catalyst is granulated and sieved [mesh size 3–4 mm.] and used in a solid-bed reactor. The atomic proportion of titanium:vanadium is, in the catalyst ready for use, 1:0.98.

Catalyst II

The precipitation step of catalyst I is repeated. Well-washed, most precipitate with a content of 314 g. titanium vanadate (dry basic) is mixed with stirring with 79 g. Aerosil, a brand of a chemically pure silicic acid in a submicroscopically fine distribution, to form a pulp. The pulp is pressed onto clay disks, dried at 200° C., then heated for 3 hours at 300° C. and then 8 hours at 490° C. The catalyst is formed into granules of 3–4 mm. and employed in a solid-bed reactor.

Catalyst III

The precipitation step of catalyst I is repeated. Well-washed, moist precipitate with a content of 314 g. titanium vanadate, dry basic, is stirred to a pulp with 300 g. Aerosil. The pulp is pressed onto clay disks and dried at 200° C. Thereafter, the pulp is heated for 3 hours to 300° C. and for 8 hours to 490° C. The catalyst is formed into granules of 3–4 mm. and employed in a solid-bed reactor.

Catalyst IV 750 g. $Al(NO_3)_3 \cdot 9H_2O$ and 182 g. vanadium pentoxide are dissolved in 3.5 liters concentrated hydrochloric acid. Into an agitated vessel containing 2 liters of water, the acidic solution is introduced under stirring, and then neutralized with ammonia, under the constant control of a glass electrode. During the precipitation, 5 liters of water are added batchwise. The precipitation period is 15 minutes; the temperature in the agitated vessel is 35–40° C. At this latter temperature, the reaction mixture is stirred for another hour. The mother liquor is vacuum-filtered and discarded, and the precipitate is washed with water, dried at 200° C., and heated for 16 hours at 500° C. The catalyst is comminuted and sieved [mesh size 0.1 to 0.3 mm., apparent density 0.9 kg./l.]. The atomic proportion Al:V in the catalyst ready for use is 1:1.05. The catalyst is employed in a fluid-bed reactor.

Catalyst V 750 g. $Al(NO_3)_3 \cdot 9H_2O$ are dissloved in 500 g. 34% aqueous ammonium chloride solution, and 182 g. vanadium pentoxide are dissolved in 366 g. ethanolamine and 500 g. water. Into an agitated vessel containing 350 g. 34% aqueous ammonium chloride solution (the ammonium chloride serves for preventing the hydrolysis of the aluminum salt), the solutions of aluminum and vanadauim salt are introduced separately in equivalent amounts, under stirring and during a period of 5½ minutes. The temperature in the agitated vessel is 60° C., and at this temperature, the reaction mixture is stirred for another hour. The mother liquor is separated, and the precipitate is further processed as described in connection with catalyst IV. The apparent density of the sieve fraction of a particle size of 0.1 to 0.3 mm. is 0.7 kg./l., the atomic proportion of Al:V in the catalyst ready for use is 1:0.86. The catalyst is employed in a fluid-bed reactor.

Catalyst VI 375 g. aluminum nitrate, 142.5 g. titanium tetrachloride, and 182 g. vanadium pentoxide are dissolved in 2.5 liters concentrated hydrochloric acid. This solution is processed, as described in connection with catalyst I, to obtain the catalyst ready for use. The apparent density of the sieve fraction of 0.1–0.3 mm. is 1.1 kg./l. The atomic proportion of Ti+Al:V=0.46+0.54:1.1. The catalyst is employed in a fluid-bed reactor.

EXAMPLE 1

Into a conventional quartz fluidized bed reactor having a diameter of 40 mm. heated by a salt bath there are introduced 150 ml. catalyst [sieve fraction 0.1–0.3 mesh]. Through the reactor, there are conducted 150 l./h. of air, 10 l./h. of n-butene, and steam [see Table I]. The effluent gas is cooled, thereby condensing the water and the acids which can be separated. The waste gas contains, in addition to carbon oxides, unreacted butene. The most favorable reaction conditions for the individual catalysts and the butene conversions obtained thereby, as well as the yields of the individual reaction products are listed in the following Table I.

TABLE I.—CONVERSION AND YIELDS IN THE BUTENE OXIDATION IN FLUID-BED REACTOR

| No. | Catalyst | Amount of steam (l./h.) | Internal temp. of reactor, ° C. | Butene conversion, percent |
|---|---|---|---|---|
| 1 | I | 150 | 245 | 95 |
| 2 | IV | 100 | 315 | 70 |
| 3 | V | 100 | 315 | 68 |
| 4 | VI | 150 | 260 | 60 |

Yields in molar percent.

| No. | Acetic acid | Propionic acid | Formic acid | Maleic acid | Formaldehyde | Carbon oxides |
|---|---|---|---|---|---|---|
| 1 | 55 | 0.5 | 0.5 | 4 | 0 | 35 |
| 2 | 49 | 5.0 | 0.0 | 20 | 4 | 21 |
| 3 | 47 | 0.5 | 0.0 | 3 | 6 | 41 |
| 4 | 45 | 1.0 | 0.5 | 8 | 0.5 | 43 |

EXAMPLE 2

Into a steel tube (length of 5 m. and an internal diameter 10 mm. heated by a saline bath, there are introduced 250 cm.³ of catalyst having a particle size of 3–4 mm. Per hour, there are conducted through this reactor 10 liters n-butene, 300 liters air, and steam [see Table II]. The effluent gas is cooled; water and acid condense, and can be separated. The waste gas contains in addition to carbon oxides, unreacted butene. The most favorable reaction conditions for the individual catalysts and the butene conversions achieved thereby, as well as the yields of the individual reaction products are tabulated in Table II.

TABLE II.—CONVERSION AND YIELD OF BUTENE OXIDATION IN SOLID-BED REACTOR

| No. | Catalyst | Amount of steam (l./h.) | Internal temp. of reactor, °C. | Butene conversion, percent |
|---|---|---|---|---|
| 5 | I | 200 | 245 | 80 |
| 6 | II | 170 | 270 | 70 |
| 7 | III | 150 | 290 | 55 |

Yields in molar percent.

| No. | Acetic acid | Propionic acid | Formic acid | Maleic acid | Formaldehyde | Carbon oxides |
|---|---|---|---|---|---|---|
| 5 | 61 | 0.5 | 0 | 8 | 0.5 | 29 |
| 6 | 62 | 1.0 | 0 | 9 | 2.0 | 25 |
| 7 | 60 | 1.0 | 0 | 9 | 3.3 | 24 |

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the production of acetic acid by the gas phase oxidation of butenes with oxygen containing gases in the presence of a vanadate catalyst, the improvement which comprises employing as the vanadate catalyst a member selected from the group consisting of titanium vanadate and aluminum vanadate, said catalyst having been calcined at 300–700° C.

2. A process as defined by claim 1, wherein the oxidation is conducted at temperatures of 200–350° C.

3. A process as defined by claim 1, wherein the oxidation is conducted at temperatures of 230–320° C.

4. A process as defined by claim 1 wherein the oxidation is conducted in the presence of steam.

5. A process as defined by claim 2 wherein the oxidation is conducted in the presence of steam.

6. A process as defined by claim 1 wherein the vanadate catalyst is titanium vanadate.

7. A process as defined by claim 1 wherein the vanadate catalyst is aluminum vanadate.

8. A process as defined in claim 1, wherein said catalyst is calcined at 480–520° C.

References Cited

UNITED STATES PATENTS 2,097,904   1937   Walters _____ 260—533

FOREIGN PATENTS 1,173,887   1964   Germany.

LORRAINE A. WEINBERGER, *Primary Examiner.*

D. STENZEL, *Assistant Examiner.*

U.S. Cl. X.R.

260—604